United States Patent [19]
Constantin

[11] Patent Number: 5,884,739
[45] Date of Patent: Mar. 23, 1999

[54] COUPLING ASSEMBLY WITH RESERVOIR FOR HIGHLY VISCOUS FLUID

[75] Inventor: Bernd Constantin, Düsseldorf, Germany

[73] Assignee: GKN Viscodrive Gmbh, Lohmar, Germany

[21] Appl. No.: 912,437

[22] Filed: Aug. 18, 1997

[30] Foreign Application Priority Data

Aug. 23, 1996 [DE] Germany .................. 296 14 615.3

[51] Int. Cl.[6] .............................................. F16D 25/0638
[52] U.S. Cl. ........................ 192/35; 192/57; 192/85 AA; 192/103 F
[58] Field of Search ............................. 192/106 F, 103 F, 192/35, 57, 85 AA

[56] References Cited

U.S. PATENT DOCUMENTS

| | | | |
|---|---|---|---|
| 4,905,808 | 3/1990 | Tomita et al. | 192/103 F X |
| 5,346,043 | 9/1994 | Haka | 192/57 X |
| 5,526,912 | 6/1996 | Gassmann | 192/85 AA X |
| 5,556,343 | 9/1996 | Gassmann | 192/85 AA X |
| 5,632,185 | 5/1997 | Gassmann | 192/103 F X |
| 5,690,201 | 11/1997 | Gassmann | 192/35 |

*Primary Examiner*—Rodney H. Bonck
*Assistant Examiner*—Ankur Parekh
*Attorney, Agent, or Firm*—Howard & Howard

[57] ABSTRACT

A coupling assembly has a friction coupling with friction plates alternately connected to respective ones of first and second coaxial parts which are rotatable relative to one another. A hydraulic actuating device for actuating the friction coupling has an annular chamber formed in one of the first and second parts. The annular chamber is defined by an axially movable piston which acts on the friction plates and containing a conveyor member for effecting fluid shear. The conveying member is connected to the other of the first and second parts. The annular chamber receives a highly viscous fluid, such that a pressure build up is generated to increase torque transmission between the first and second parts. The annular chamber is connected to a compensating chamber with a variable volume force for the highly viscous fluid. The compensating chamber is formed by an axially open annular groove and an axially movable annular element sealing said annular groove. The annular element includes a plate-spring-like conical end wall and annular sealing elements adjoining the plate-spring-like conical end wall.

12 Claims, 2 Drawing Sheets

COUPLING ASSEMBLY WITH RESERVOIR FOR HIGHLY VISCOUS FLUID

BACKGROUND OF THE INVENTION

The invention relates to a coupling assembly with two coaxial parts which are rotatable relative to one another, with one of the parts being provided with an annular chamber which contains a highly viscous fluid in which, upon relative rotation of the parts relative to one another, fluid shear is effected by means of a conveying member connected to the other one of the parts, as a result of which a pressure build-up is generated in the annular chamber for the purpose of increasing a transmission of torque between the parts, with the annular chamber being hydraulically connected to a compensating chamber with a variable volume for the highly viscous fluid, which compensating chamber is formed by an axially open annular groove and an axially movable annular element sealing the annular groove.

Coupling assemblies of this type are known from DE 43 43 307 A1 and U.S. Pat. No. 4,905,808 (FIG. 23) wherein the annular chamber is delimited by an axially movable piston loading a friction coupling assembly whose plates are alternately connected to one each of the parts rotatable to one another. In order to ensure that, when moving the piston, the annular chamber remains completely filled and for compensating for any thermal changes in volume in the friction coupling assembly, there is provided a reservoir which is formed of an axially open annular groove and an annular piston which is movable therein and loaded by plate springs.

Coupling assemblies in the sense of the invention are primarily all assemblies wherein a conveying member connected to one of the rotatable parts rotates in an annular chamber, with the annular chamber being sealed by an axially movable piston, so that a displacement of the piston requires a change in volume.

Coupling assemblies of this type, in the sense of the invention, are also conventional viscous couplings wherein the annular chamber contains a larger number of plates which are alternately connected to the two parts rotatable relative to one another. In such assemblies, a change in temperature in the enclosed viscous fluid is connected with a change in volume which may necessitate volume compensating measures.

It is the object of the present invention to provide a simple, easily sealable design for said reservoir.

SUMMARY OF THE INVENTION

The objective is achieved in that the annular element comprises a plate-spring-like conical end wall and annular sealing elements adjoining same. In this way, the annular element constitutes the end wall and a resilient element. In a preferred embodiment, the sealing elements comprise cylindrical annular webs or annular lips which rest against the annular walls of the annular chamber. The annular sealing element preferably points towards the inside of the compensating chamber, so that the internal pressure in the compensating chamber contributes towards the sealing effect.

In a preferred embodiment, sealing rings are inserted into grooves in the annular walls of the annular groove which are contacted by the annular webs or annular lips.

In this way, there are achieved advantageous and cheap sealing means. As an alternative, it is possible for the annular webs or annular lips to comprise pressed-out regions into which there are inserted sealing rings resting against the annular walls of the annular groove. In this way it is possible to simplify the production of the annular groove.

Furthermore, it is proposed that at least one securing ring constituting an axial stop for the annular element is inserted into a circumferential groove in the annular groove in one of the annular walls. Furthermore, it is possible for an annular edge constituting an axial stop for the annular element in the annular groove to be formed in one of the annular walls of the annular groove. As can be seen in the embodiment described below, the coupling assembly preferably comprises a friction coupling and a hydraulic actuating device for the friction coupling, with the friction coupling comprising friction plates which are alternately connected in a rotationally fixed way to the parts rotatable relative to one another and with the actuating device comprising the annular chamber which is formed in one of the parts rotatable relative to one another and which is delimited by an axially movable piston which acts on the friction plates either directly or indirectly, which annular chamber contains the conveying member which effects the fluid shear and which is connected to the other one of the rotatable parts.

For comparative purposes, a coupling according to the state of the art is illustrated together with a preferred embodiment of a coupling in accordance with the invention.

DETAILED DESCRIPTION OF THE INVENTION

Figure 1:
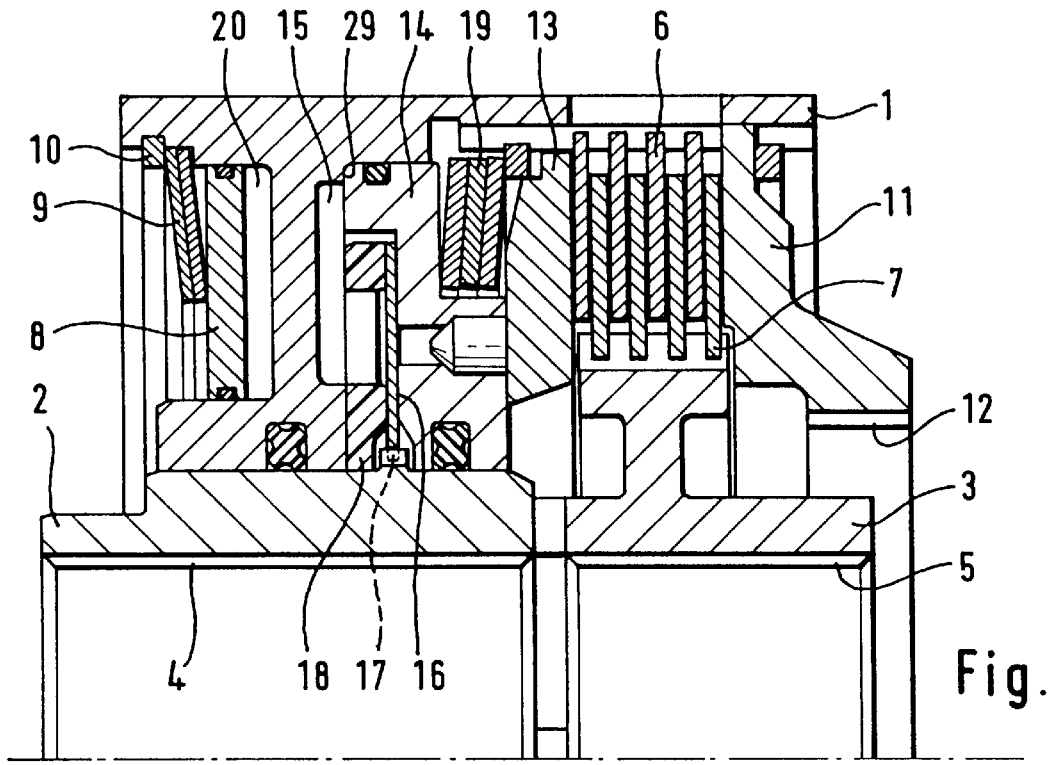
FIG. 1 is half a longitudinal section through the above mentioned species of a coupling assembly in accordance with the state of the art.

Unless reference is made to certain differences, the Figures will now be described jointly. There is shown a rotational housing 1 constituting the outer component which forms the first of the parts rotatable relative to one another. Details will be referred to later. A driving flange 11 with inner toothing 12 is inserted into the housing 1 so as to be rotationally fixed and axially secured. In the housing 1 there are held two coaxial hubs 2, 3 which are produced independently of one another but are provided with identical inner toothings 4, 5. The hubs 2, 3 are connected to one another in a rotationally fixed way by inserting a driving journal into the two toothed regions. In the fitted condition, the two hubs 2, 3, jointly, form the second one of the parts rotatable relative to one another. Outer plates 6 are connected in a rotationally fixed way to the housing 1, with alternating outer plates 6 and inner plates 7 being connected to the hub 3 in a rotationally fixed way. The plates 6, 7 which are axially supported on the driving flange 11 and which are directly loadable by a pressure plate 13 form a friction coupling. The friction plate 13, in turn, is directly loaded by an axially movable annular piston 14 which delimits an annular chamber 15 in the housing, in which annular chamber 15 a fluid pressure is generated when the parts 1, 2 and 3 rotate relative to one another. In the annular chamber 15 it is possible to identify a conveying member 16 which, by toothing means 17, is connected to the hub 2 in a rotationally fixed way. The annular chamber 15 also contains a pressure generating and control member 18 which is rotatable in the housing 1 to a limited extent, with the rotational stops not being visible in the sectional view shown. The pressure generating and control member ensures that, independently of the relative direction of rotation of the parts 1, 2 and 3 relative to one another, pressure is built up in the annular chamber 15 at any relative rotation. As a result of the pressure build-up, the annular piston 14 is axially displaced towards the pressure plate 13. A package of plate springs 19 supported in the housing 1 initially acts against any axial displacement. When the annular piston 14 is displaced, the volume in the annular chamber 15 changes. Through a connecting bore positioned in a different sectional plane, a change in volume takes place from the interior of the compensating chamber 20. This is formed by an annular groove 21 in the housing 1 and by a displaceable end element.

In FIG. 1, the end element is formed by an annular piston 8 which is pretensioned by plate springs 9 supported on a securing ring 10.

Figure 2:
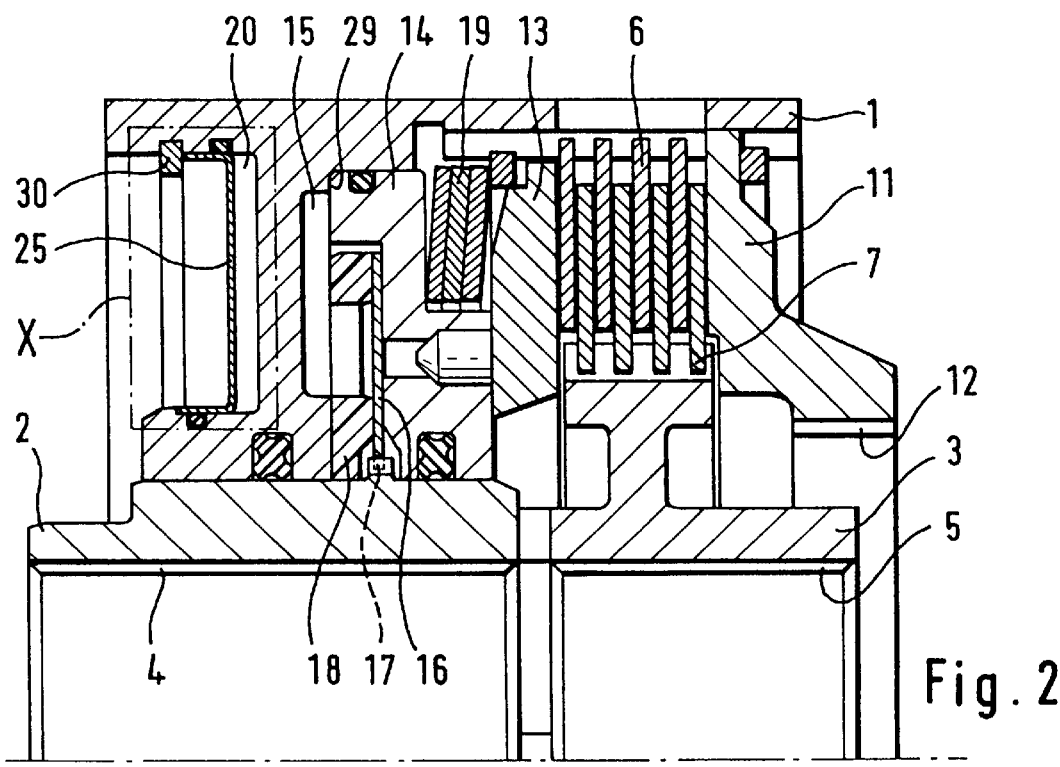
FIG. 2 is half a longitudinal section through a coupling assembly in accordance with the invention.
Figure 3:
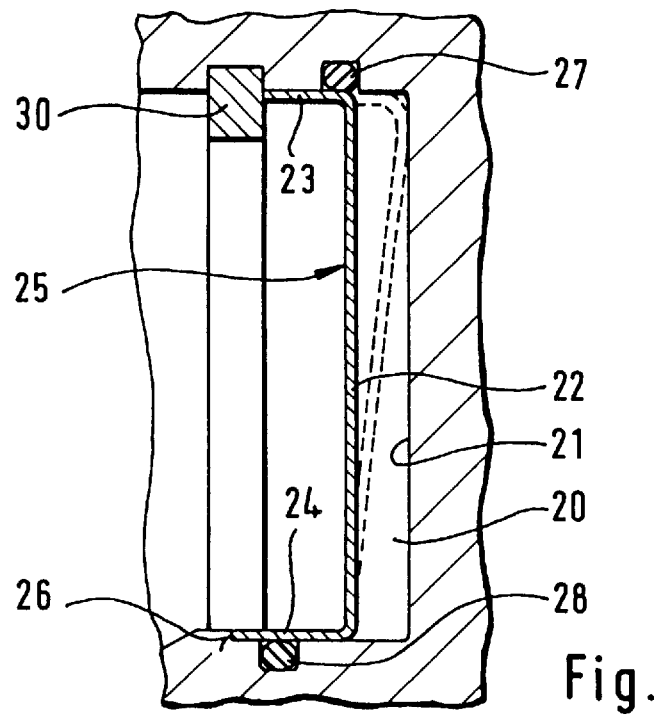
FIG. 3 in an enlarged scale, shows the components of the inventive coupling assembly according to FIG. 2 which form the compensating chamber.

In accordance with the invention which is illustrated in FIGS. 2 and 3, the compensating chamber 20 is formed by an identically designed, axially open annular groove 21 and by an annular element 25 with a deformable conical end wall 22 whose inside and outside are provided with cylindrical annular webs 23, 24.

Into the outer side wall of the annular groove 21 there is inserted a securing ring 30 constituting an axial stop for the annular web 23. In the inner annular wall of the annular groove 21 there is provided an annular edge 26 which supports the annular web 24 at its end. O-rings 27, 28, inserted into recesses 29 serve to seal the compensating chamber 20. The position of the annular element 25 illustrated by continuous lines shows the minimum volume of the compensating chamber at which the annular piston 14 reaches its maximum displacement towards the friction coupling 6, 7, with the dashed lines showing the maximum of the compensating chamber at which the annular volume of chamber 15 comprises its minimum volume, i.e. the annular piston 14 rests against a stop edge 29 in the annular Chamber 15 under the pretension of the plate springs 19.

Figure 3A:
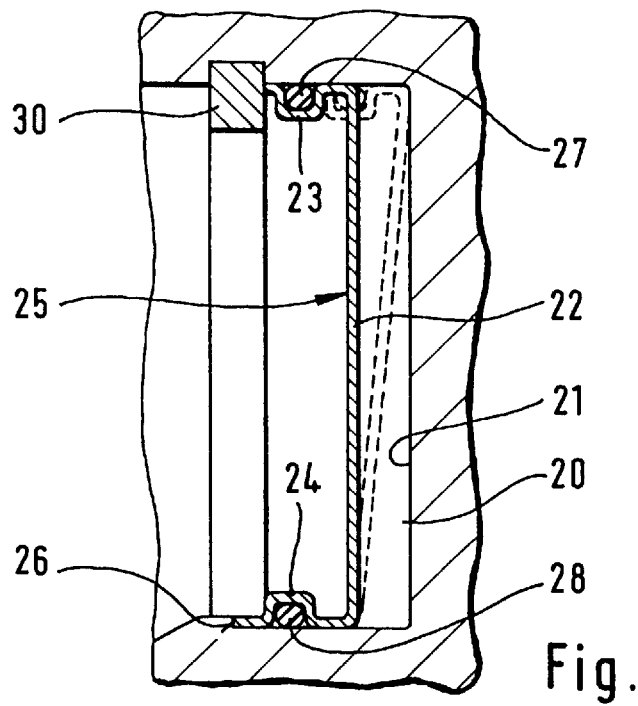
FIG. 3A shows an alternative embodiment

FIG. 3A shows an alternative webs 23a, 24a wherein the recesses 29a are formed as formed regions in the webs 23a, 24a and received the O-ring 27, 28.

Preferred embodiments have been disclosed. A worker in the art would recognize that modifications come within the scope of this invention. The scope of the invention is thus defined by the following claims.

I claim:

1. A coupling assembly with two coaxial parts (1; 2, 3) which are rotatable relative to one another, with one of the parts (1) being provided with an annular chamber (15) which contains a highly viscous fluid in which, upon relative rotation of the parts (1; 2, 3) relative to one another, fluid shear is effected by means of a conveying member (16) connected to the other one of the parts (2, 3), as a result of which a pressure build-up is generated in the annular chamber (15) for the purpose of increasing a transmission of torque between the parts (1; 2, 3), with the annular chamber (15) being hydraulically connected to a compensating chamber (20) with a variable volume for the highly viscous fluid, which compensating chamber (20) is formed by an axially open annular groove (21) and an axially movable annular element (25) sealing the annular groove (21), wherein the annular element (25) comprises deformable conical end wall (22) and annular sealing elements (23, 24) adjoining same.

2. An assembly according to claim 1, wherein said annular groove (21) comprises annular walls and said sealing elements comprise cylindrical members (23, 24) which rest against said annular walls of the annular groove (21).

3. An assembly according to claim 2, wherein said annular walls of the annular groove (21) which are contacted by said cylindrical members (23, 24) are provided with sealing rings (27, 28) which are inserted into grooves.

4. An assembly according to claim 2, wherein said cylindrical members (23, 24) comprise formed regions into which there are inserted sealing rings resting against said annular walls of said annular groove (21).

5. An assembly according to claim 1, wherein said annular groove (21) comprises annular walls and said sealing elements comprise annular webs which rest against said annular walls of the annular groove (21).

6. An assembly according to claim 5, wherein said annular walls of annular groove (21) which are contacted by said annular webs are provided with sealing rings (27, 28) which are inserted into grooves.

7. An assembly according to claim 5, wherein said annular webs comprise formed regions into which there are inserted sealing rings resting against said annular walls of said annular groove (21).

8. An assembly according to claim 1, wherein at least one securing ring (30) constituting an axial stop for said annular element (25) is inserted into a circumferential groove in said annular groove (21) in one of the annular walls.

9. An assembly according to claim 1, wherein an annular edge (26) constituting an axial stop for said annular element (25) is formed in said annular groove (21) in one of the annular walls.

10. An assembly according to claim 1, wherein said coupling assembly comprises a friction coupling and a hydraulic actuating device for the friction coupling, with said friction coupling comprising friction plates (6, 7) which are alternately connected in a rotationally fixed way to said parts (1; 2, 3) rotatable relative to one another and with said actuating device comprising said annular chamber (15) which is formed in one of the parts (1) rotatable relative to one another and which is delimited by an axially movable piston (14) which acts on said friction plates (6, 7) either directly or indirectly, which annular chamber (15) contains said conveying member (16) which effects the fluid shear and which is connected to the other one of the rotatable parts (2, 3).

11. A coupling assembly comprising:
a friction coupling having alternately connected sets of friction plates connected to respective ones of first and second coaxial parts which are rotatable relative to one another;

a hydraulic actuating device for actuating said friction coupling, said hydraulic actuating device having an annular chamber formed in one of said first and second parts, said annular chamber defined by an axially movable piston which acts on said friction plates, said annular chamber receiving a highly viscous fluid, and said annular chamber containing a conveyor member for effecting fluid shear, said conveying member being connected to the other of said first and second parts, such that a pressure build up being generated in said annular chamber to increase torque transmission between said first and second parts, said annular chamber being connected to a compensating chamber with a variable volume for said highly viscous fluid, said compensating chamber being formed by an axially open groove and an axially movable element sealing said groove, said element comprising a plate-spring-like conical end wall and sealing elements adjoining said plate-spring-like conical end wall.

12. A coupling assembly according to claim 11, wherein said groove of said element and said sealing elements are all annular.

* * * * *